(12) United States Patent
Nonoyama et al.

(10) Patent No.: US 9,431,661 B2
(45) Date of Patent: Aug. 30, 2016

(54) CATHODE CATALYST LAYER, MEMBRANE ELECTRODE ASSEMBLY AND POLYMER ELECTROLYTE FUEL CELL AND MANUFACTURING METHOD THEREOF

(75) Inventors: Nobuaki Nonoyama, Susono (JP); Masanori Aimu, Susono (JP); Randal Lewis Perry, Hockessin, DE (US); Mark Gerrit Roelofs, Earleville, MD (US); Robert Clayton Wheland, Wilmington, DE (US); Ralph Munson Aten, Chadds Ford, PA (US)

(73) Assignees: TOYOTA JIDOSHA KABUSHIKI KAISHA, Toyota-Shi (JP); E.I. DUPONT DE NEMOURS AND COMPANY, Wilmington, DE (US)

( * ) Notice: Subject to any disclaimer, the term of this patent is extended or adjusted under 35 U.S.C. 154(b) by 303 days.

(21) Appl. No.: 13/995,635

(22) PCT Filed: Dec. 20, 2011

(86) PCT No.: PCT/JP2011/007116
§ 371 (c)(1),
(2), (4) Date: Feb. 21, 2014

(87) PCT Pub. No.: WO2012/086185
PCT Pub. Date: Jun. 28, 2012

(65) Prior Publication Data
US 2014/0154608 A1 Jun. 5, 2014

(30) Foreign Application Priority Data

Dec. 20, 2010 (JP) ................................. 2010-283009

(51) Int. Cl.
H01M 4/86 (2006.01)
H01M 4/88 (2006.01)
H01M 8/10 (2016.01)

(52) U.S. Cl.
CPC .......... *H01M 4/8657* (2013.01); *H01M 4/8652* (2013.01); *H01M 4/8663* (2013.01); *H01M 4/8668* (2013.01); *H01M 8/1004* (2013.01); H01M 4/886 (2013.01); H01M 2008/1095 (2013.01); Y02E 60/521 (2013.01); Y02P 70/56 (2015.11)

(58) Field of Classification Search
None
See application file for complete search history.

(56) References Cited

U.S. PATENT DOCUMENTS

| | | |
|---|---|---|
| 5,211,984 A | 5/1993 | Wilson |
| 2002/0098407 A1 | 7/2002 | Kunisa et al. |
| 2003/0077503 A1 | 4/2003 | Yoshitake et al. |
| 2005/0112448 A1 | 5/2005 | Nakamura et al. |
| 2007/0286948 A1 | 12/2007 | Shimoda et al. |
| 2009/0215938 A1 | 8/2009 | Tayanagi et al. |

FOREIGN PATENT DOCUMENTS

| | | |
|---|---|---|
| CN | 1643719 A | 7/2005 |
| CN | 1739216 A | 2/2006 |
| EP | 1739780 A1 | 1/2007 |
| JP | H09-320611 | 12/1997 |
| JP | 2003-036856 A | 2/2003 |
| JP | 2007-265844 A | 10/2007 |
| JP | 2010251086 A | 11/2010 |
| WO | 01/22510 A1 | 3/2001 |

*Primary Examiner* — Jonathan Crepeau
(74) *Attorney, Agent, or Firm* — Kenyon & Kenyon LLP

(57) ABSTRACT

A cathode catalyst layer used for a polymer electrolyte fuel cell that includes an electrolyte membrane is provided. The cathode catalyst layer comprises a catalyst having weight of not greater than 0.3 mg/cm$^2$ of a reaction surface of the cathode catalyst layer that is adjoining the electrolyte membrane; and an electrolyte resin having oxygen permeability of not less than $2.2 \times 10^{-14}$ mol/m/s/Pa in an environment of temperature of 80 degrees Celsius and relative humidity of 50%.

9 Claims, 7 Drawing Sheets

— : Pt COATING WEIGHT (LARGE)
— : Pt COATING WEIGHT (SMALL)
- - - : CORRESPONDING TO DECREASE IN CATALYTIC ACTIVITY

- ■ : SIMULATION RESULT
- — : CORRESPONDING TO DECREASE IN CATALYTIC ACTIVITY (WITHOUT CONTRIBUTION OF IONOMER)

- —○— FIRST IONOMER (WORKING EXAMPLE)
- --■-- SECOND IONOMER (COMPARATIVE EXAMPLE)

CATHODE CATALYST LAYER, MEMBRANE ELECTRODE ASSEMBLY AND POLYMER ELECTROLYTE FUEL CELL AND MANUFACTURING METHOD THEREOF

CROSS REFERENCE TO RELATED APPLICATION

This is a national phase application based on the PCT International Patent Application No. PCT/JP2011/007116 filed on Dec. 20, 2011, claiming priority to Japanese application No. 2010-283009, filed Dec. 20, 2010, the entire contents of both of which are incorporated herein by reference.

TECHNICAL FIELD

The present invention relates to a catalyst layer of a polymer electrolyte fuel cell.

BACKGROUND ART

A catalyst layer including carbon with platinum as the catalyst supported thereon and an electrolyte resin (ionomer) is used as the catalyst layer of the polymer electrolyte fuel cell. Since platinum is expensive, it is desired to reduce the amount of platinum used. Techniques for reducing the amount of platinum used have been proposed.

SUMMARY OF INVENTION

Technical Problem

Decreasing the amount of platinum used for the catalyst layer, however, leads to the lowered power generation efficiency of the fuel cell (power generation performance). There is accordingly a need to improve the power generation efficiency of the polymer electrolyte fuel cell, simultaneously with reducing the amount of platinum used. This problem is not characteristic of platinum but is commonly found for any catalysts available as the catalyst for oxygen reduction reaction, for example, noble metals including gold, silver and ruthenium and base metals including iron, nickel and manganese.

There is a requirement for suppressing degradation of power generation efficiency of a polymer electrolyte fuel cell, while reducing the amount of a catalyst used for oxygen reduction reaction.

Solution to Problem

The present invention accomplishes at least part of the requirement mentioned above and the other relevant requirements by any of various aspects and applications discussed below.

According to an aspect of the invention, a cathode catalyst layer is provided. The cathode catalyst layer used for a polymer electrolyte fuel cell that includes an electrolyte membrane, comprises: a catalyst having weight of not greater than 0.3 mg/cm$^2$ of a reaction surface of the cathode catalyst layer that is adjoining the electrolyte membrane; and an electrolyte resin having oxygen permeability of not less than $2.2*10^{-14}$ mol/m/s/Pa in an environment of temperature of 80 degrees Celsius and relative humidity of 50%.

The cathode catalyst layer according to the aspect uses the catalyst having the weight of not greater than 0.3 mg/cm$^2$ of the reaction surface and thereby reduces the amount of the catalyst used, while using the electrolyte resin having the high oxygen permeability of not less than $2.2*10^{-14}$ mol/m/s/Pa in the environment of temperature of 80 degrees Celsius and relative humidity of 50% and thereby reducing the oxygen diffusion resistance. Applying this cathode catalyst layer to a polymer electrolyte fuel cell suppresses degradation of power generation efficiency of the fuel cell. The temperature and the relative humidity are respectively set to 80 degrees Celsius and 50%, because of the following reason. The polymer electrolyte fuel cell generally operates in, for example, a temperature range of 60 degrees Celsius to 100 degrees Celsius according to the actual properties of the polymer electrolyte membrane, except temporary situations, such as the time of start-up and the time of load variation. The polymer electrolyte fuel cell is also used in a certain humidity environment, since a certain degree of moisture is essential for the high proton conductivity and water is generated by the electrode reaction. The oxygen permeability under the general operating conditions of temperature of 80 degrees Celsius and relative humidity of 50% is accordingly specified herein. The electrolyte resin having the high oxygen permeability under these operating conditions keeps the advantageous effects in any operating conditions other than these operating conditions, except the temporary situations.

In the cathode catalyst layer of the above aspect of the invention, the catalyst may has weight of not greater than 0.1 mg/cm$^2$ of the reaction surface.

The cathode catalyst layer of this aspect further decreases the amount of the catalyst used. The cathode catalyst layer of this aspect uses the electrolyte resin having the high oxygen permeability of not less than $2.2*10^{-14}$ mol/m/s/Pa in the environment of temperature of 80 degrees Celsius and relative humidity of 50%. This effectively prevents significant degradation of power generation efficiency of the fuel cell including this cathode catalyst layer even under the condition of the decreased amount of the catalyst.

In the cathode catalyst layer of the above aspect of the invention, the catalyst may have surface area of not greater than 200 cm$^2$/cm$^2$ of the reaction surface.

The cathode catalyst layer of this aspect reduces the amount of the catalyst used, compared with a cathode catalyst layer using a catalyst having the same particle diameter but having the surface area of greater than 200 cm$^2$/cm$^2$ of the reaction surface. The surface area of the catalyst is relatively small as not greater than 200 cm$^2$/cm$^2$ of the reaction surface. The cathode catalyst layer of this aspect, however, uses the electrolyte resin having the high oxygen permeability of not less than $2.2*10^{-14}$ mol/m/s/Pa in the environment of temperature of 80 degrees Celsius and relative humidity of 50%. This effectively prevents significant degradation of power generation efficiency of the polymer electrolyte fuel cell including this cathode catalyst layer.

In the cathode catalyst layer of the above aspect of the invention, the catalyst may be platinum.

This aspect reduces the amount of expensive platinum used, thus saving the production cost of the cathode catalyst layer.

According to another aspect of the invention, a membrane electrode assembly may comprise the cathode catalyst layer of the above aspect.

According to a preferable embodiment, there is provided a cathode catalyst layer used for a polymer electrolyte fuel cell that includes an electrolyte membrane, comprising: a catalyst having weight of not greater than 0.3 mg/cm2 of a reaction surface of the cathode catalyst layer that is adjoining the electrolyte membrane; and an electrolyte resin having oxygen permeability of not less than 2.2*10-14 mol/m/s/Pa in an environment of temperature of 80 degrees Celsius and relative humidity of 50%, wherein the electrolyte resin is a copolymer comprising: (a) polymerized units of one or more fluoromonomer (A-1) or (A-2),

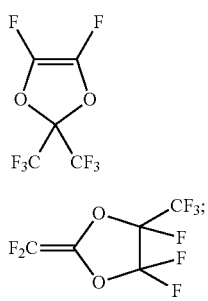

[Chem.1]

and (b) polymerized units of one or more fluoromonomer (B), where the fluoromonomer (B) is selected from perfluorosulfonic acid monomer and derivatives and salts thereof and perfluorosulfonate monomer and derivatives and salts thereof.

The fluoromonomer (B) may be $CF_2=CF-O-[CF_2]_n-SO_2X$, n=2, 3, 4 or 5, X=F, Cl, OH or OM, and M is a monovalent cation.

A preferable example of the electrolyte resin is a copolymer of the fluoromonomer (A-1) with the fluoromonomer (B) that is $CF_2=CF-O-[CF_2]_n-SO_2X$, wherein n=2 and X=OH.

This aspect reduces the amount of the catalyst used for the membrane electrode assembly, thus saving the production cost of the membrane electrode assembly. Additionally, this aspect effectively suppresses degradation of power generation efficiency of a polymer electrolyte fuel cell including this membrane electrode assembly.

According to another aspect of the invention, there is provided a polymer electrolyte fuel cell that may comprise the cathode catalyst layer of the above aspect.

This aspect reduces the amount of the catalyst used for the polymer electrolyte fuel cell, thus saving the production cost of the polymer electrolyte fuel cell while suppressing degradation of power generation efficiency of the polymer electrolyte fuel cell.

According to another aspect of the invention, a manufacturing method of a polymer electrolyte fuel cell is provided. The method comprises forming a cathode catalyst layer on either an electrolyte membrane or a gas diffusion layer, wherein the cathode catalyst layer includes: an electrolyte resin having oxygen permeability of not less than $2.2*10^{-14}$ mol/m/s/Pa in an environment of temperature of 80 degrees Celsius and relative humidity of 50%; and a catalyst for oxygen reduction reaction having weight of not greater than 0.3 mg/cm² of a reaction surface of the cathode catalyst layer.

The manufacturing method according to the aspect uses the catalyst having the weight of not greater than 0.3 mg/cm² of the reaction surface for the cathode catalyst layer formed on either the electrolyte membrane or the gas diffusion layer and thereby reduces the amount of the catalyst used, while using the electrolyte resin having the high oxygen permeability of not less than $2.2*10^{-14}$ mol/m/s/Pa in the environment of temperature of 80 degrees Celsius and relative humidity of 50% and thereby reducing the oxygen diffusion resistance. This effectively suppresses degradation of power generation efficiency of the manufactured polymer electrolyte fuel cell.

The present invention may be actualized by diversity of other applications, for example, a manufacturing method of a catalyst layer.

DESCRIPTION OF EMBODIMENTS

A. Embodiment

A1. Structure of Fuel Cell

Figure 1:
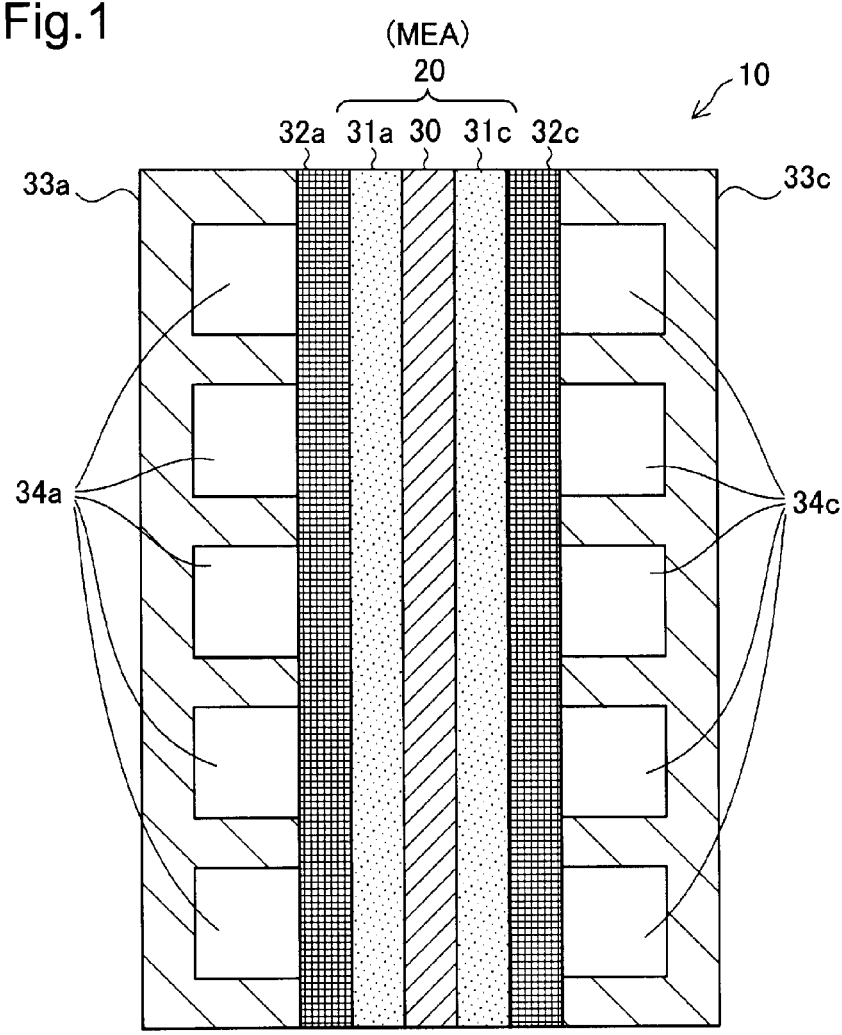
FIG. 1 is a sectional view showing a fuel cell including a catalyst layer according to one embodiment of the invention.

FIG. 1 is a sectional view showing a fuel cell including a catalyst layer according to one embodiment of the invention. The fuel cell 10 is a polymer electrolyte fuel cell and generates electric power through the electrochemical reaction of a fuel gas and an oxidizing gas. In this embodiment, hydrogen gas and the air are respectively used as the fuel gas and the oxidizing gas. The fuel cell 10 is applied to, for example, a fuel cell stack for supplying the driving power of an electric vehicle. The fuel cell 10 includes an electrolyte membrane 30, a cathode catalyst layer 31c, a cathode gas diffusion layer 32c, a cathode-side separator 33c, an anode catalyst layer 31a, an anode gas diffusion layer 32a and an anode-side separator 33a.

The cathode catalyst layer 31c is provided adjacent to the electrolyte membrane 30. The surface of the cathode catalyst layer 31c adjoining the electrolyte membrane 30 corresponds to the reaction surface in the claims. The cathode gas diffusion layer 32c is provided adjacent to the cathode catalyst layer 31c to be in contact with the outer surface of the cathode catalyst layer 31c (i.e., opposite surface to the surface adjoining the electrolyte membrane 30). The cathode-side separator 33c is provided adjacent to the cathode gas diffusion layer 32c to be in contact with the outer surface of the cathode gas diffusion layer 32c (i.e., opposite surface to the surface adjoining the cathode catalyst layer 31c). The cathode-side separator 33c has concavo-convex shape, so that oxidizing gas flow paths 34c are formed between the cathode-side separator 33c and the adjoining cathode gas diffusion layer 32c. The oxidizing gas flow paths 34c introduce the air supplied from the outside to the cathode gas diffusion layer 32c, while releasing the gas (containing excess air and water vapor) discharged from the cathode gas diffusion layer 32c to the outside.

The anode-side structure is similar to the cathode-side structure. More specifically, the anode catalyst layer 31a has the same structure as that of the cathode catalyst layer 31c. The anode gas diffusion layer 32a and the anode-side separator 33a respectively have the same structures as those of the cathode gas diffusion layer 32c and the cathode-side separator 33c. Fuel gas flow paths 34a formed between the anode-side separator 33a and the anode gas diffusion layer 32a introduce the fuel gas (hydrogen gas) to the anode gas diffusion layer 32a, while releasing the gas (produced water vapor) discharged from the anode gas diffusion layer 32a to the outside.

Figure 2:
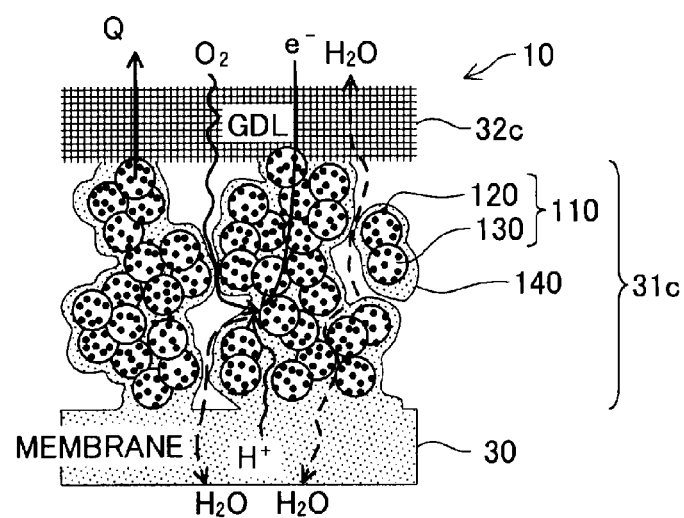
FIG. 2 is a close-up view schematically illustrating the structure around the cathode catalyst layer shown in FIG. 1.

FIG. 2 is a close-up view schematically illustrating the structure around the cathode catalyst layer shown in FIG. 1. The cathode catalyst layer 31c includes catalyst-support carbon 110 prepared by making catalyst particles 120 supported on a carbon carrier 130, and an ionomer 140. The catalyst particles 120 serve as the catalyst. In this embodiment, platinum is used for the material of the catalyst particles 120. Additionally, in this embodiment, carbon black is used for the carbon carrier 130.

The ionomer 140 is a proton-conductive electrolyte resin and is provided to surround the catalyst-support carbon 110. In this embodiment, the ionomer 140 may contain, for example, a cyclic compound having ring structure as disclosed in JP 2003-36856 as its basic skeleton to have high oxygen permeability. Some examples of the ionomer 140 (synthesis of the ionomer 140) will be given later.

The electrolyte membrane 30 may be a membrane containing the ionomer 140 as shown in FIG. 2. In this case, the composition of the electrolyte membrane 30 may be substantially similar to the composition of the ionomer 140. The electrolyte membrane 30 may have different ion exchange capacity from the ion exchange capacity of the ionomer 140. The electrolyte membrane 30 may contain another proton-conductive ion exchange resin different from the ionomer 140. According to other embodiments, a composite membrane of a proton-conductive electrolyte resin and an inorganic material or an electrolyte membrane that does not contain any proton-conductive electrolyte resin but exerts the proton conductivity in the similar temperature and humidity conditions may also be applied to the polymer electrolyte fuel cell of the invention.

Carbon cloth of unwoven fabric or carbon paper may be used for the cathode gas diffusion layer 32c. Alternatively, a resin or metal porous material may be used for the cathode gas diffusion layer 32c.

The air (oxygen) flowing through the oxidizing gas flow paths 34c shown in FIG. 1 is supplied to the cathode catalyst layer 31c across the cathode gas diffusion layer 32c as shown in FIG. 2. Additionally, hydrogen ion (proton) is supplied from the electrolyte membrane 30 to the cathode catalyst layer 31c. Electrons generated on the anode are further supplied to the cathode catalyst layer 31c across the cathode gas diffusion layer 32c. Consequently, oxygen reduction reaction expressed by Formula (1) given below proceeds around the catalyst particles 120 of the cathode catalyst layer 31c:

[Math.1]

$$\frac{1}{2}O_2 + 2H^+ + 2e^- \rightarrow H_2O \tag{1}$$

The fuel cell 10 of the above structure may be manufactured according to the following procedure. The manufacturing process prepares slurry for catalyst layer containing the catalyst particles 120 and the ionomer 140, applies the prepared slurry for catalyst layer on both surfaces of the electrolyte membrane 30 and dries the applied slurry to form catalyst layers (cathode catalyst layer 31c and anode catalyst layer 31a). The manufacturing process then locates the electrolyte membrane 30 with the catalyst layers between members for gas diffusion layers (e.g., carbon paper) and hot-presses the assembly to complete the fuel cell 10. The platinum coating weight (weight of platinum per unit area on the surface of the catalyst layer adjoining the electrolyte membrane 30) may be controlled by regulating the content of the catalyst particles 120 contained in the slurry for catalyst layer. The platinum coating weight may also be controlled by regulating the application amount of the slurry on the electrolyte membrane 30. The above manufacturing process may be modified to apply the slurry for catalyst layer on the cathode gas diffusion layer 32c (e.g., carbon paper), in place of or in addition to the electrolyte membrane 30.

A2. Synthesis of Ionomers

Examples of synthesis of copolymers as the ionomer 140 are described below according to Table 1.

TABLE 1

Synthesis of ionomer precursor polymers (sulfonyl fluoride form, —SO₂F)

| | | | | Product | | | |
|---|---|---|---|---|---|---|---|
| Example | PDD | PFSVE | Weight | Equivalent Weight | Mole % PDD/PFSVE | Inherent Viscosity, dL/g | Tg, ° C. (DSC) |
| 1 | 8 ml | 17.5 ml | 15 g | 908 g | 72.1/27.9 | 0.384 | 135 |
| 2 | 4 ml | 5 ml | 7 g | 1320 g | 81.0/19.0 | 0.434 | 184 |

TABLE 1-continued

Synthesis of ionomer precursor polymers (sulfonyl fluoride form, —SO$_2$F)

| | | | | Product | | | |
|---|---|---|---|---|---|---|---|
| Example | PDD | PFSVE | Weight | Equivalent Weight | Mole % PDD/PFSVE | Inherent Viscosity, dL/g | Tg, °C. (DSC)*[1] |
| 3 | 8 ml | 11 ml | 11 g | 1201 g | 79.1/20.1 | 0.333 | 185 |
| 4 | 8 ml | 12.7 ml | 15 g | 1095 g | 77.0/23.0 | 0.356 | 164 |
| 5 | 8 ml | 15 ml | 16 g | 1077 g | 76.6/23.4 | 0.468 | 168 |
| 6 | 16 ml | 35 ml | 36 g | 834 g | 69.5/30.5 | | |
| 7 | 18.5 ml | 39 ml | 36 g | 712 g | 63.9/36.1 | | |
| 8 | 4 ml | 10 ml | 8 g | 595 g | 56.5/43.5 | | |

*[1] The Tg shown in Table 1 were mesured by DSC on the precursor polymers (i.e. polymers in the —SO$_2$X form with X = F)

In the description herein, the following abbreviations are used:
DSC: Differential Scanning calorimetry
EW: Equivalent Weight
HFB: hexafluorobenzene
HFPO Dimer Peroxide:
$CF_3CF_2CF_2OCF(CF_3)(C=O)OO(C=O)CF(CF_3)OCF_2CF_2CF_3$
Mn: number average molecular weight
Mw: weight average molecular weight
PDD: Perfluorodimethyl dioxole
PFSVE: $CF_2=CFOCF_2CF_2SO_2F$
Teflon (Reg. U.S. Pat. & Tm. Off.): Trademark of E. I. du Pont de Nemours and Company
Vertrel™ XF: $CF_3CFHCFHCF_2CF_3$ (Miller-Stephenson Chemical Company, Danbury, Conn., USA)

Example 1

Synthesis of Poly(PDD/PFSVE), 72.1:27.9

A magnetic stir bar was added to a sample vial and the vial capped with a serum stopper. Accessing the vial via syringe needles, the vial was flushed with nitrogen (N$_2$), chilled on dry ice, and then 8 ml of PDD was injected, followed by injection of 17.5 ml of PFSVE. The chilled liquid in the vial was sparged for 1 minute with N$_2$, and finally 1 ml of ~0.2 M HFPO dimer peroxide in Vertrel™ XF was injected. The syringe needles through the serum stopper were adjusted to provide a positive pressure of N$_2$ to the vial as the vial was allowed to warm to room temperature with magnetic stirring of its contents. After three hours, the reaction mixture in the vial had thickened sufficiently to make magnetic stirring difficult. After 2 to 3 days, another 1 ml of HFPO dimer peroxide solution was injected and mixed in with manual shaking of the vial. No additional thickening of the reaction mixture occurred overnight. The contents of the vial were transferred to a dish lined with Teflon® film (E. I. du Pont de Nemours and Company, Wilmington, Del.). The reaction mixture was devolatilized by blowing down for several hours with N$_2$ and then by putting the dish in a 100-120 degrees Celsius vacuum oven overnight. This gave 15.0 g of polymer (sulfonyl fluoride form, —SO$_2$F) in the form of a hard white foam. This polymer was analysed as follows:
Inherent viscosity: 0.384 dL/g in hexafluorobenzene
Tg=135 degrees Celsius by DSC, 2$^{nd}$ heat, 10 degrees Celsius/min, N2
Composition (by NMR): 72.1 mole % PDD, 27.9 mole % PFSVE MW after hydrolysis to —SO$_3$H form: Mn=167,057; Mw=240,706

Examples 2-8

Synthesis of PDD/PFSVE Polymers

Additional polymers (in the sulfonyl fluoride form, —SO$_2$F) made by the same method of Example 1 are listed in Table 1, below. Example 1 from above is included in the table. The order in the table follows decreasing PDD content.

The copolymer of Example 5 was examined by $^{19}$F-NMR at 470 MHz. The spectrum was acquired at 30 degrees Celsius using 60 mg of sample dissolved in hexafluorobenzene (HFB). A coaxial tube with $C_6D_6$/CFCl$_3$ was inserted in the NMR tube for locking and chemical shift referencing. The peak at about 43 ppm, due to the —SO$_2$F of PSFVE, had intensity 10035 (arb. units). Several peaks were observed between −72 and −88 ppm due to the two CF$_3$'s of PDD (6F's) and the —OCF$_2$— of PFSVE (2F's), the sum of their intensities being 217707. The mole fraction of PFSVE was determined as 10035/{[(217707-2(10035))/6]+10035}=23.4%. When hydrolyzed, the equivalent weight (EW) was estimated as (0.766*243.98+0.234*277.95)/0.234=1077. A similar analysis was performed on the other copolymers presented in Table 1 to determine their composition.

A copolymer, Example 6, was prepared in a similar manner as in Example 1, except the reaction was double in scale with 16 ml PDD, 35 ml of PFSVE, and 2 ml of initiator solution. $^{19}$F-NMR analysis indicated 30.5 mole % PFSVE and 834 EW. The copolymer (36 g), in sulfonyl fluoride form (—SO$_2$F), was dissolved in HFB to make a 15 wt % solution which was filtered through a 1 micron filter. The solution was cast using a doctor blade with 30 mil gate height onto Kapton® polyimide film (DuPont, Wilmington, Del., USA) and the HFB evaporated at ambient conditions to give a clear film. After separation from the Kapton®, larger pieces of the film together with film fragments (31.7 g total) were hydrolyzed to salt form by heating in KOH:dimethyl sulfoxide:water (10:20:70 wt %) for 24 h at 110 degrees Celsius. Examination of a film piece of 112 micron thickness by transmission FTIR showed the absence of a 1472 cm$^{-1}$ peak associated with sulfonyl fluoride, indicating completion of the hydrolysis. The film pieces were rinsed in water, filtered to recover the smaller fragments, and dried in vacuum overnight to give 31.33 g of hydrolyzed film. The film pieces were converted to acid form (—SO$_3$H) by soaking in 20 wt % nitric acid for 1 h at 80 degrees Celsius. After the initial soak, the nitric acid was replaced with fresh acid, and followed by a second 1 h soak. The films were rinsed for 15 min in water in a beaker, with continued changing to fresh water until the pH of the water in the beaker remained neutral. The larger pieces and film fragments recovered by filtering were dried in a vacuum oven at 100 degrees Celsius and reweighed to give 28.2 g of acid-form polymer. It was judged that the weight loss was the amount expected from loss of missing film fragments and loss on the filter papers, suggesting that dissolution of the polymer itself was minimal.

Figure 3:
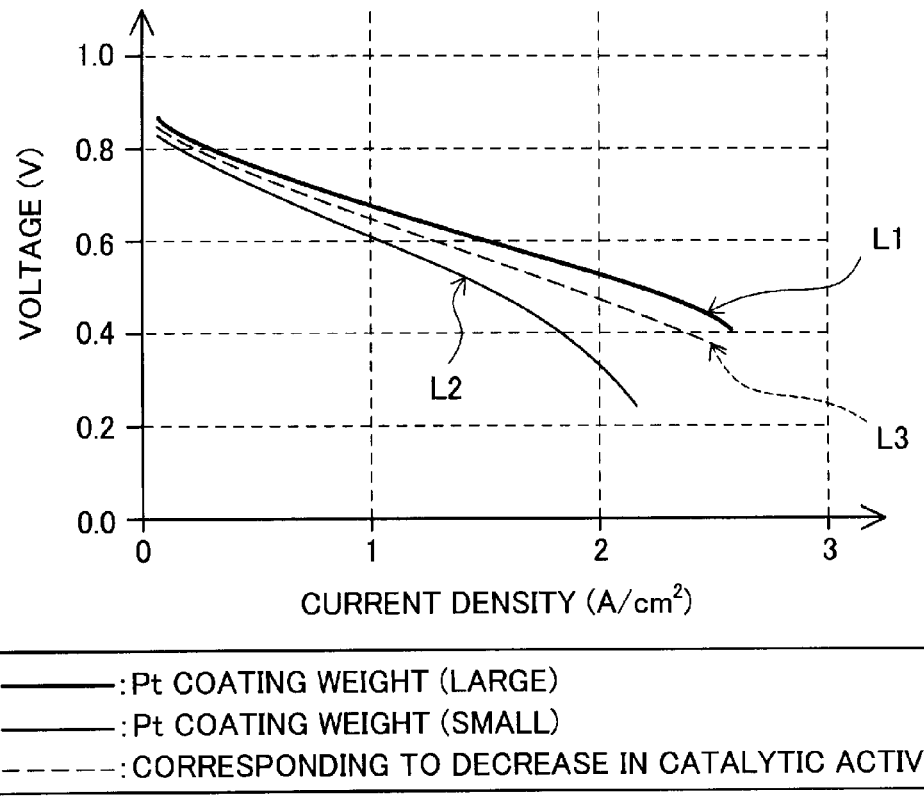
FIG. 3 is a graph illustrating the relationship between the platinum coating weight of the cathode catalyst layer and the power generation efficiency (performance) of the fuel cell 10.

A3. Analysis of Performance Degradation with Decrease in Platinum Coating Weight FIG. 3 is a graph illustrating the relationship between the platinum coating weight of the cathode catalyst layer and the power generation efficiency (performance) of the fuel cell 10. The abscissa and the ordinate in the graph of FIG. 3 respectively show the current density ($A/cm^2$) and the cell voltage (V). In the graph of FIG. 3, a thick solid-line curve L1 shows the simulation result of the fuel cell performance (cell voltage against current density) under the condition of large platinum coating weight (for example, 0.5 $mg/cm^2$). A thin solid-line curve L2 shows the simulation result of the fuel cell performance under the condition of small platinum coating weight (for example, 0.2 $mg/cm^2$). A broken-line curve L3 shows the simulation result of the voltage corresponding to a decrease in catalytic activity per reaction area of MEA discussed later.

According to the comparison between the curves L1 and L2 shown in FIG. 3, the condition of small platinum coating weight has the lower power generation efficiency of the fuel cell 10, compared with the condition of large platinum coating weight. More specifically, the condition of small platinum coating weight causes the lower cell voltage at a fixed current density. Especially a high-current area (1 to 2 $A/cm^2$) has significant performance degradation under the condition of small platinum coating weight. Decreasing the platinum coating weight proportionally decreases the platinum surface area and thereby reduces the catalytic activity per unit area of MEA. The overvoltage of oxidation reduction reaction (ORR) then increases according to the known Butler-Volmer equation given by Equations (2) and (3) below, which may result in lowering the cell voltage as shown by the curve L3. In Equations (2) and (3), the constant "R" represents the gas constant (8.314 J/Kmol), and the constant "F" represents the Faraday constant (96485 C/mol). The variables "T", "$A_{Pt}$", "$i_{ORR}$", "$i_0$", "$C_{O2}$", "$C_{O2}^{ref}$" and "$(alpha)_c$" respectively represent the temperature (K), the platinum surface area per unit area of MEA ($cm^2/cm^2$), the kinetic current density ($A/cm^2$), the exchange current density ($A/cm^2$), the oxygen concentration ($mol/m^3$), the oxygen concentration in the reference state ($mol/m^3$) and the transfer coefficient.

[Math. 2]
$$i_{ORR} = A_{Pt} i_0 \left(\frac{C_{O2}}{C_{O2}^{ref}}\right)^\gamma \exp\left(\frac{-\alpha_c F}{RT} \eta_{ORR}\right) \quad (2)$$

[Math. 3]
$$\eta_{ORR} = \frac{-RT}{\alpha_c F} \log(A_{Pt}) + const. \quad (3)$$

The curve L2 is, however, deviated from the curve L3, and the lower cell voltage that accompanies the decrease in platinum coating weight is not fully explainable by only the decrease in catalytic activity. The applicant has specifically focused on the diffusion resistance in the MEA (catalyst layer).

Figure 4:
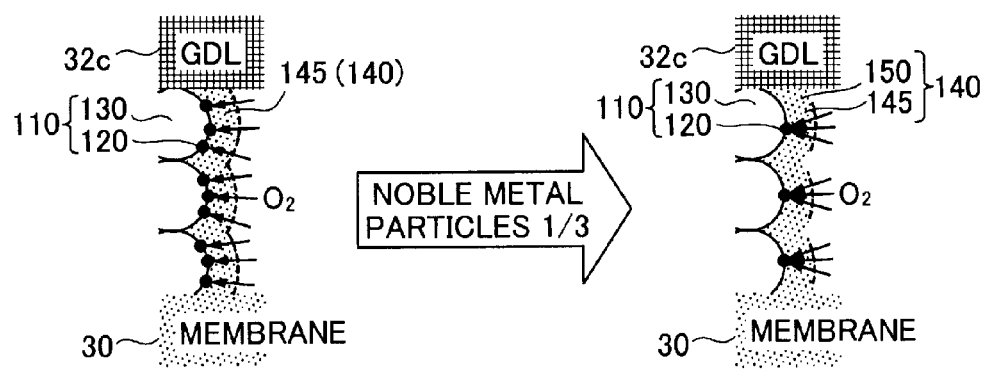
FIG. 4 is a close-up view schematically illustrating the surface of the catalyst particles in the cathode catalyst layer.

FIG. 4 is a close-up view schematically illustrating the surface of the catalyst particles in the cathode catalyst layer. The left drawing of FIG. 4 shows the surface of the catalyst-support carbon 110 having a relatively large coating weight of the catalyst particles 120 (platinum), and the right drawing shows the surface of the catalyst-support carbon 110 having a relatively small coating weight of the catalyst particles 120. The coating weight of the catalyst particles 120 in the right drawing is one third of the coating weight of the catalyst particles 120 in the left drawing. The left drawing and the right drawing of FIG. 4 have the same properties except the coating weight of the catalyst particles 120 (for example, oxygen permeability of the ionomer 140).

As shown in the left drawing of FIG. 4, under the condition of large coating weight of the catalyst particles 120, most of the ionomer 140 surrounding the catalyst-support carbon 110 may be used for permeation (supply) of oxygen. A specific portion (surface) corresponding to the ionomer 140 involved in oxygen supply (hereinafter called "oxygen supply ionomer 145") is shown by the broken line. As shown in the right drawing of FIG. 4, under the condition of small coating weight of the catalyst particles 120, on the other hand, the ionomer 140 located close to the catalyst particles 120 may be the oxygen supply ionomer 145, whilst the ionomer 140 located away from the catalyst particles 120 may be the ionomer 140 uninvolved in oxygen supply to the catalyst particles 120 (hereinafter called "non-oxygen supply ionomer 150"). More specifically, decreasing the coating weight of the catalyst particles 120 may reduce the ratio of the oxygen supply ionomer 145 to the whole ionomer 140 and thereby decrease the ionomer surface area involved in oxygen permeation. Decreasing the ionomer surface area involved in oxygen permeation may result in increasing the diffusion resistance in the cathode catalyst layer 31c. As shown in FIG. 2, oxygen (oxygen molecules) flowing through the oxidizing gas flow paths 34c passes through the cathode gas diffusion layer 32c and approaches the catalyst-support carbon 110. Oxygen eventually passes through the ionomer 140 covering the catalyst particles 120 (platinum) (i.e., oxygen supply ionomer 145) and reaches the surface of the catalyst particles 120 to cause the oxidation reduction reaction. The surface area of the ionomer involved in oxygen permeation (i.e., oxygen supply ionomer 145) may be proportional to the surface of the catalyst particles 120.

Figure 5:
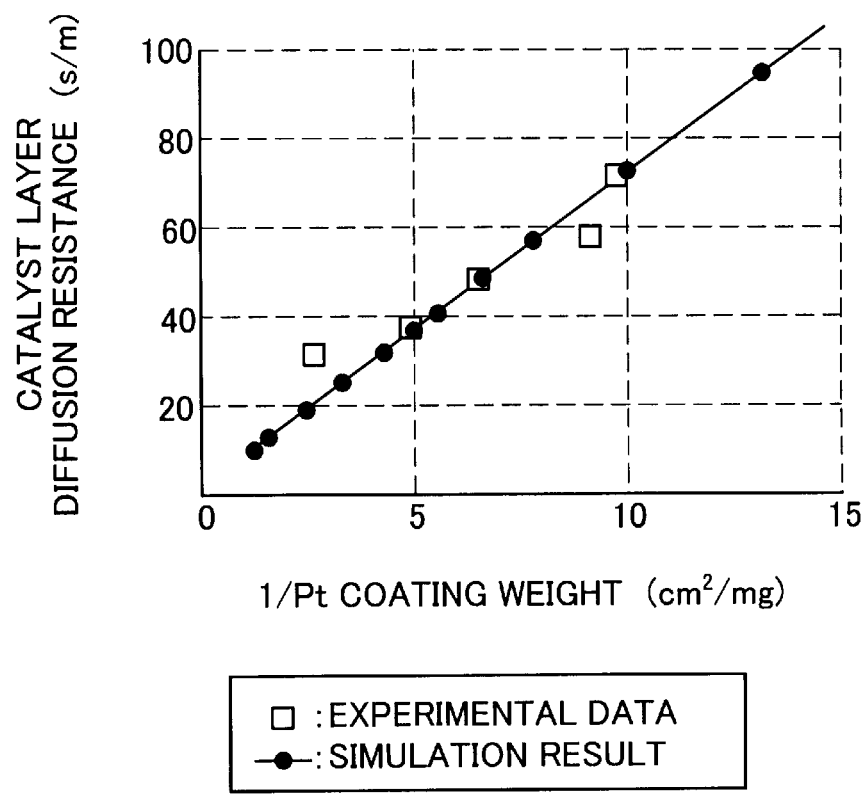
FIG. 5 is a graph illustrating the relationship between the coating weight of the catalyst particles (platinum) and the diffusion resistance of the catalyst layer obtained as the simulation result and the experimental result.

FIG. 5 is a graph illustrating the relationship between the coating weight of the catalyst particles (platinum) and the diffusion resistance of the catalyst layer obtained as the simulation result and the experimental result. The abscissa and the ordinate of FIG. 5 respectively show the platinum coating weight ($cm^2/mg$) and the diffusion resistance (s/m) of the catalyst layer. In the illustrated example of FIG. 5, the reciprocal of platinum coating weight (1/platinum coating weight) is plotted along the abscissa. The closed circles show the simulation result, and the open rectangles show the experimental data.

The experimental result of FIG. 5 shows the variation in diffusion resistance determined from the measurement of power generation performance against the varying platinum coating weight under the following experimental conditions according to a known catalyst layer diffusion resistance determination procedure. The experimental conditions for measuring the cell voltage were: using a cell having a relatively small reaction surface area (1 cm$^2$), supplying a high flow of gas (not less than 500 ml/min) to prevent the occurrence of power generation distribution in the cell plane and varying the electric current flowing through the cell. The electrolyte membrane, the catalyst-support carbon and the ionomer used were respectively NRE211 (manufactured by DuPont), 30% by weight Pt/C (manufactured by Tanaka Holdings Co., Ltd.) and DE2020 (manufactured by DuPont). The known catalyst layer diffusion resistance determination procedure herein is the determination process described in the known document (S. S. Kocha, in Handbook of Fuel Cells; Fundamentals, Technology, and Applications, Vol. 3, W. Vielstich, A. Lamm and H. A. Gasteiger Editors, p 538, John, Wiley & Sons, Inc., New York (2003)).

According to the experimental result shown in FIG. 5, the diffusion resistance of the catalyst layer increases with a decrease in platinum coating weight, i.e., is inversely proportional to the platinum coating weight.

The simulation result of FIG. 5 was obtained by simulating the power generation performance with a known agglomerate model including an ionomer film on the catalyst surface (Nobuaki Nonoyama and Yoshihiro Ikogi, ECS Trans. 16(2), 13 (2008) and A. Z. Wber and J. Newman, Chemical Reviews, 104, 4679 (2004)) adopted as the catalyst layer model of the fuel cell and calculating the diffusion resistance of the catalyst layer from the simulation result. The simulation performed modeling of the catalyst layer according to Equations (4) and (5) given below. Equation (5) shows modeling of the relationship between the effective ionomer surface area (Aion) and the platinum surface area (APt). The applicant performed simulation with setting "n (exponential)=1" on the assumption that "the surface area of the ionomer involved in oxygen permeation (effective ionomer surface area) is proportional to the surface area of the catalyst particles (platinum)" as described above. The simulation was based on the property data of the electrolyte membrane, the catalyst and the ionomer used in the above experiment. The unknown parameters (for example, i0 (exchange current density) and (delta)ion (ionomer film thickness)) were determined by fitting to the experimental data shown in FIG. 5.

[Math. 4]

$$i_{ORR} = 4F \frac{P_{O2}}{P_{O2}^{ref}} \left( \frac{1}{\frac{\delta_{ion}}{A_{ion} P_{O2}^{ref} \psi_{O2ion}} + \frac{1}{\theta k_{ORR}}} \right) \quad (4)$$

[Math. 5]

$$A_{ion} = \alpha (A_{pt})^n \quad (5)$$

In Equation (4), "iORR", the constant "F", the variable "PO2", the variable "PO2ref", the variable "(delta)ion", the variable "(psi)O2ion", the variable "(theta)" and the variable "kORR" respectively represent the reaction current, the Faraday constant, the oxygen partial pressure, the oxygen partial pressure in the reference state, the ionomer film thickness, the oxygen permeation coefficient, the effective utilization ratio(agglomerate effect) and the reaction rate. In Equation (5), the variable "Aion", the variable "(alpha)" and the variable "APt" respectively represent the effective ionomer surface area, the proportionality factor and the platinum surface area.

According to the simulation result shown in FIG. 5, the diffusion resistance of the catalyst layer increases with a decrease in platinum coating weight, i.e., is inversely proportional to the platinum coating weight. The simulation result well agreed with the experimental result as shown in FIG. 5. This may lead to the conclusions that the catalyst layer modeled according to Equations (4) and (5) given above is sufficiently accurate to approximate the actual catalyst layer and the assumption that "the surface area of the ionomer involved in oxygen permeation is proportional to the surface area of the catalyst particles (platinum)" is reasonable. Based on such conclusions, the applicant has further assumed that the performance degradation of the fuel cell accompanied with a decrease in amount of the catalyst particles (platinum) is reducible using the ionomer having high oxygen permeability.

Figure 6:
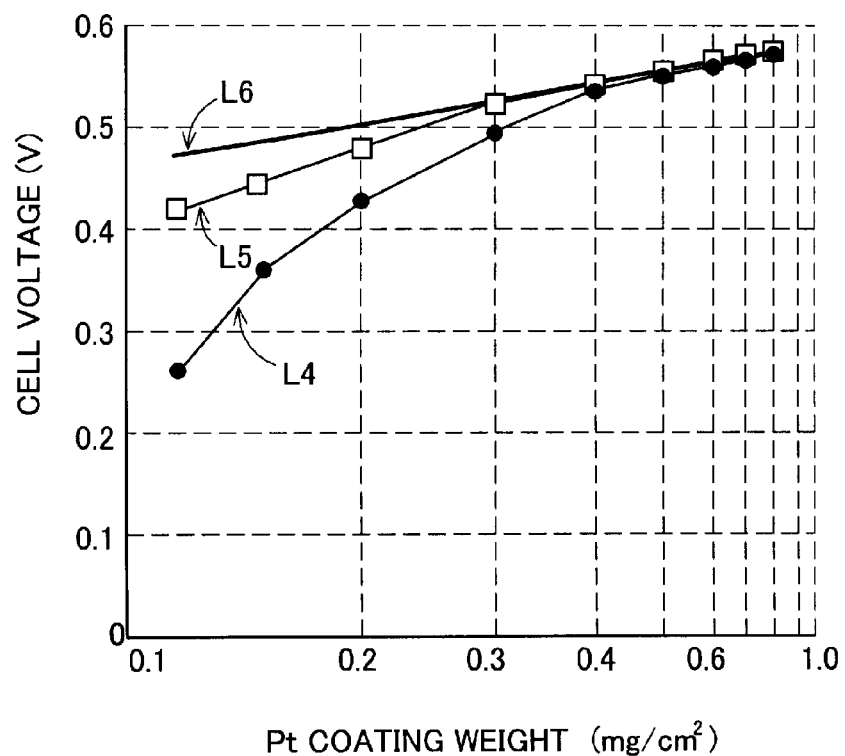
FIG. 6 is a graph showing the relationship between the platinum coating weight and the cell voltage obtained as the simulation results.

FIG. 6 is a graph showing the relationship between the platinum coating weight and the cell voltage obtained as the simulation results. The abscissa and the ordinate of FIG. 6 respectively show the platinum coating weight (mg/cm$^2$) and the cell voltage (V). In the graph of FIG. 6, a curve L4 shows the simulation result based on the property data of the conventional ionomer (DE2020), and a curve L5 shows the simulation result with doubling the oxygen permeability of the conventional ionomer. The curves L4 and L5 were obtained by the simulations with setting the variable "APt" (platinum surface area) to a value corresponding to the platinum coating weight in the range of 0.1 mg/cm$^2$ to 0.8 mg/cm$^2$. Both the simulations for calculating the cell voltage were performed under the following conditions: the cell temperature of 80 degrees Celsius, the oxygen concentration of 13%, the pressure of 140 kPa, the relative humidity of 50% and the current density of 1.5 A/cm$^2$. The cell temperature of 80 degrees Celsius and the relative humidity of 50% were used as the simulation conditions, because of the following reason. The polymer electrolyte fuel cells generally operate in, for example, a temperature range of 60 degrees Celsius to 100 degrees Celsius according to the actual properties of the polymer electrolyte membrane, except temporary situations, such as the time of start-up and the time of load variation. The polymer electrolyte fuel cells are also used in a certain humidity environment, since a certain degree of moisture is essential for the high proton conductivity and water is generated by the electrode reaction. The simulations were thus performed with setting the temperature and the relative humidity to these general operating conditions, 80 degrees Celsius and 50%. In the graph of FIG. 6, a curve L6 shows the simulation result of the cell voltage by the cause of only the decrease in catalytic activity relative to the reference performance under the condition of sufficiently large platinum coating weight of 0.8 mg/cm$^2$ according to the above Butler-Volmer equation (Equations (2) and (3)).

According to the comparison between the curve L6 and the curve L4, there is significant performance degradation by the cause other than the decrease in catalytic activity in the platinum coating weight of not greater than 0.3 mg/cm$^2$. This significant performance degradation may be ascribed to the increase in diffusion resistance that accompanies a decrease in ionomer surface area as discussed above. According to the comparison between the curve L4 and the curve L5, the ionomer having the higher oxygen permeability (i.e., double) has the higher cell voltage (i.e., smaller difference from the curve L6) than the ionomer having the lower oxygen permeability under the condition of fixed platinum coating weight. This means that ionomer having the higher oxygen permeability more effectively suppresses the performance degradation of the fuel cell. The graph proves the especially large effect of reducing the performance degradation in the platinum coating weight of not greater than 0.3 mg/cm$^2$.

Figure 7:
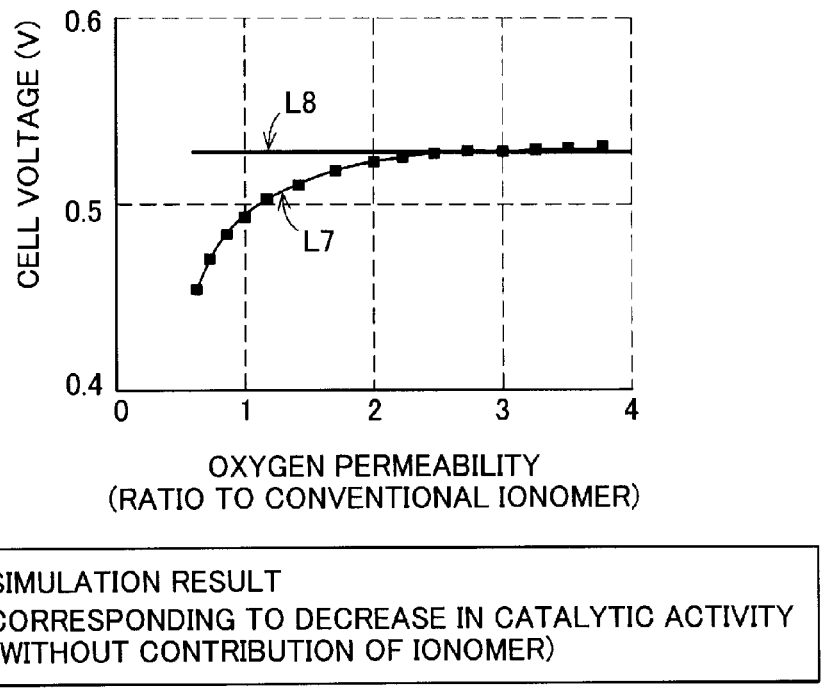
FIG. 7 is a graph showing the relationship between the oxygen permeability and the cell voltage under the condition of platinum coating weight of 0.3 mg/cm².

FIG. 7 is a graph showing the relationship between the oxygen permeability and the cell voltage under the condition of platinum coating weight of 0.3 mg/cm$^2$. The abscissa and the ordinate of FIG. 7 respectively show the oxygen permeability and the cell voltage (V). The oxygen permeability plotted along the abscissa is expressed by the ratio to the oxygen permeability (about 1.1*10$^{-14}$ mol/m/s/Pa) of the conventional ionomer (DE2020). For example, the value "2" on the abscissa means double the oxygen permeability of the conventional ionomer. In the graph of FIG. 7, a curve L7 of closed rectangles shows the simulation result of the cell voltage against the varying oxygen permeability under the condition of platinum coating weight of 0.3 mg/cm$^2$. A curve L8 shows the simulation result of the cell voltage by the cause of only the decrease in catalytic activity under the condition of platinum coating weight of 0.3 mg/cm$^2$.

According to the comparison between the curve L7 and the curve L8 shown in FIG. 7, the increase in diffusion resistance that accompanies a decrease in ionomer surface area decreases the cell voltage of the conventional ionomer (having the oxygen permeability of "1") by about 30 mV. The decrease in cell voltage of the ionomer having at least double the oxygen permeability of the conventional ionomer (i.e., not less than 2.2*10$^{-14}$ mol/m/s/Pa) is, on the other hand, substantially equal to the decrease in cell voltage caused by the decrease in catalytic activity. There is substantially no decrease in cell voltage caused by the increase in diffusion resistance that accompanies a decrease in ionomer surface area. This means that increasing the oxygen permeability of the ionomer to be not less than about 2.2*10$^{-14}$ mol/m/s/Pa significantly suppresses the degradation of the power generation performance of the fuel cell. Using the ionomer having such high oxygen permeability significantly suppresses the degradation of the power generation performance of the fuel cell even under the condition of small platinum coating weight (for example, not greater than 0.3 mg/cm$^2$). Although the simulation results of the embodiment are at the relative humidity of 50%, similar results are obtained at the other values of the relative humidity. Consequently, increasing the oxygen permeability to be not less than about 2.2*10$^{-14}$ mol/m/s/Pa significantly suppresses the degradation of the power generation performance.

B. Working Examples

Figure 8:
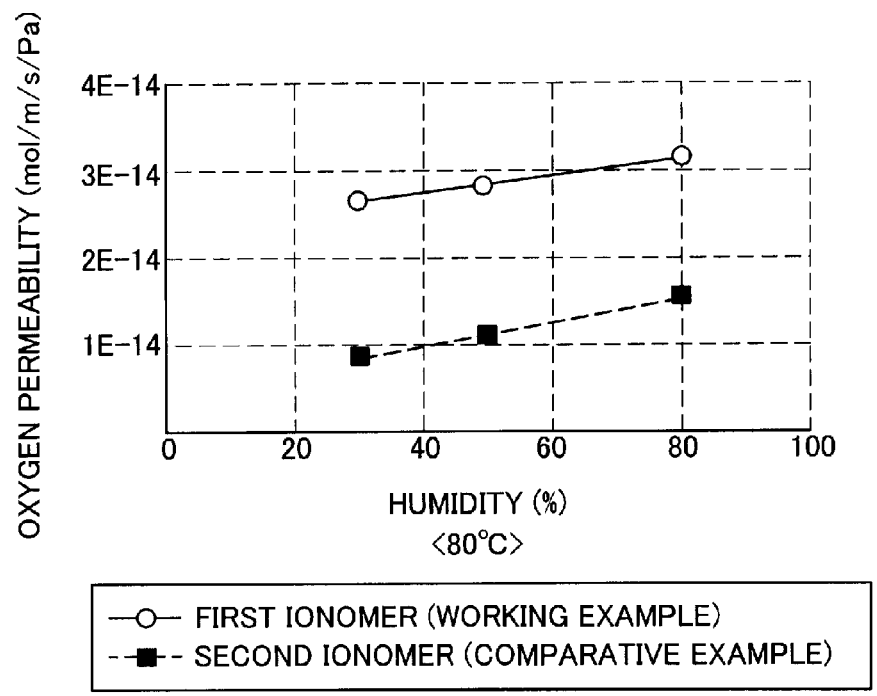
FIG. 8 is a graph showing the oxygen permeability of an ionomer according to a working example.

FIG. 8 is a graph showing the oxygen permeability of an ionomer according to a working example. The abscissa and the ordinate of FIG. 8 respectively show the relative humidity and the oxygen permeability (mol/m/s/Pa) or [mol/(m*s*Pa)]. In the graph of FIG. 8, a solid-line curve shows the oxygen permeability of the ionomer of the working example (hereinafter called "first ionomer"), and a broken-line curve shows the oxygen permeability of a conventional ionomer (hereinafter called "second ionomer") as a comparative example. The measuring process of oxygen permeability casted the first ionomer and the second ionomer to thin films (of about 0.2 millimeter in thickness) and measured the oxygen permeability of the respective thin films by the potential step method with a platinum microelectrode (ECS Transaction, 16(2), 881-889 (2008)).

The conventional ionomer "DE2020" described in the above embodiment was used as the conventional ionomer (second ionomer). Unlike the first ionomer (ionomer 140), the second ionomer is a chain compound without the ring structure as the basic skeleton and accordingly has relatively low oxygen permeability. For example, the oxygen permeability at the relative humidity of 50% is 1.1*10$^{-14}$ (mol/m/s/Pa) for the second ionomer and is about 3*10$^{-14}$ (mol/m/s/Pa) for the first ionomer; namely, the oxygen permeability of the first ionomer is about threefold higher than the oxygen permeability of the second ionomer at the relative humidity of 50%.

Figure 9:
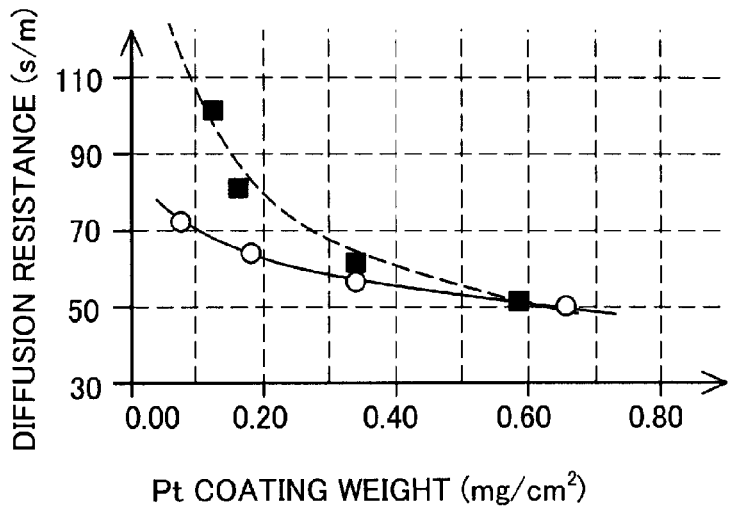
FIG. 9 is a graph showing the relationship between the platinum coating weight on the cathode and the oxygen diffusion resistance with regard to the ionomer of the working example (first ionomer) and the ionomer of the comparative example (second ionomer)

FIG. 9 is a graph showing the relationship between the platinum coating weight on the cathode and the oxygen diffusion resistance with regard to the ionomer of the working example (first ionomer) and the ionomer of the comparative example (second ionomer). The abscissa of FIG. 9 shows the platinum coating weight (mg) per unit area (1 cm$^2$) of the cathode catalyst layer 31c. The ordinate of FIG. 9 shows the oxygen diffusion resistance (s/m) on the cathode. In the graph of FIG. 9, a solid-line curve shows the relationship between the platinum coating weight and the diffusion resistance of the first ionomer, and a broken-line curve shows the relationship between the platinum coating weight and the diffusion resistance of the second ionomer.

In this working example, the platinum coating weight was controlled by regulating the application amount of slurry for catalyst layer during formation of the catalyst layer. The oxygen diffusion resistance was determined by measuring the critical current density with supplying the air having a low oxygen concentration in the environment of 80 degrees Celsius, 150 kPa and 90% as the temperature of the fuel cell (cell temperature), the gas pressure and the relative humidity.

The diffusion resistance shown in FIG. 9 is the summation of the diffusion resistance in the cathode gas diffusion layer 32c, the diffusion resistance in the voids without the catalyst-support carbon 110 in the cathode catalyst layer 31c and the diffusion resistance in the ionomer 140. As described previously with reference to FIG. 4, especially the diffusion resistance in the ionomer 140 of the total diffusion resistance is dependent on the platinum coating weight.

As shown in FIG. 9, the first ionomer has the lower diffusion resistance than the second ionomer at the platinum coating weight of not greater than 0.6 (mg/cm$^2$). More specifically, there is significant difference in diffusion resistance between the first ionomer and the second ionomer at the platinum coating weight of not greater than 0.3 (mg/cm$^2$). There is, on the other hand, relatively small difference in diffusion resistance between the first ionomer and the second ionomer at the platinum coating weight of greater than 0.3 (mg/cm$^2$). There is substantially no difference in diffusion resistance at the platinum coating weight of greater than 0.6 (mg/cm$^2$). In other words, there is no significant difference in power generation efficiency of the fuel cell 10 between the first ionomer and the second ionomer at the platinum coating weight of greater than 0.3 (mg/cm$^2$). The first ionomer more effectively suppresses the degradation of power generation efficiency of the fuel cell 10 than the second ionomer at the platinum coating weight of not greater than 0.3 (mg/cm$^2$).

The first ionomer has the lower rate of increase in diffusion resistance with a decrease in platinum coating weight than the second ionomer at the platinum coating weight of not greater than 0.6 (mg/cm$^2$). Accordingly, the first ionomer more effectively suppresses the degradation of power generation efficiency of the fuel cell 10 than the second ionomer even under the condition of the decreased amount of the catalyst particles 120 (platinum).

Figure 10:
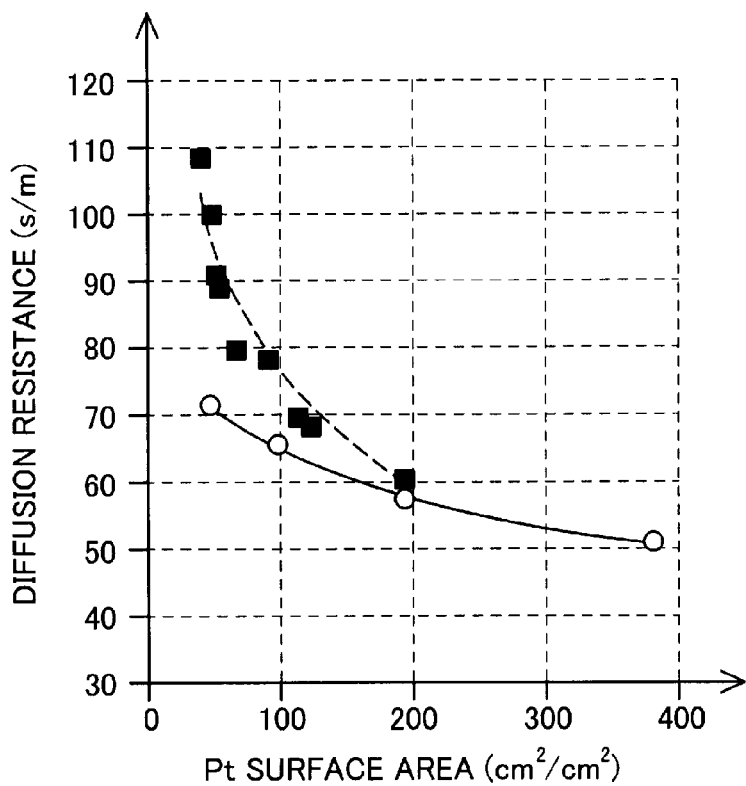
FIG. 10 is a graph showing the relationship between the platinum surface area and the oxygen diffusion resistance on the cathode with regard to the ionomer of the working example (first ionomer) and the ionomer of the comparative example (second ionomer)

FIG. 10 is a graph showing the relationship between the platinum surface area and the oxygen diffusion resistance on the cathode with regard to the ionomer of the working example (first ionomer) and the ionomer of the comparative example (second ionomer). The abscissa of FIG. 10 shows the platinum surface area (cm2) per unit area (1 cm$^2$) of the cathode catalyst layer 31c. The ordinate of FIG. 10 is identical with the ordinate of FIG. 9. In the graph of FIG. 10, a solid-line curve shows the relationship between the platinum surface area and the diffusion resistance of the first ionomer, and a broken-line curve shows the relationship between the platinum surface area and the diffusion resistance of the second ionomer.

As stated above, the diffusion resistance in the ionomer 140 is dependent on the surface area of the catalyst particles 120 (platinum). The surface area of the catalyst particles 120 (platinum) may be calculated according to the following procedure. The calculation process determines the weight of the catalyst particles 120 per unit area of the cathode catalyst layer 31c from the application amount of the slurry for catalyst layer during manufacture of the fuel cell 10, and calculates the number of the catalyst particles 120 per unit area from the specific gravity of the catalyst particles 120. The calculation process also measures the diameter of the catalyst particles 120 by the XRD method (JIS H 7805, JIS K 0131), and calculates the surface area of one catalyst particle 120 from the diameter of the catalyst particles 120. The calculation process then multiplies the calculated surface area by the number of the catalyst particles 120, so as to obtain surface area of the catalyst particles 120 per unit area of the cathode catalyst layer 31c. In this working example, the surface area of the catalyst particles 120 is controllable by regulating the application amount of the slurry for catalyst layer during formation of the catalyst layer (i.e., by regulating the number of the catalyst particles 120 per unit area). The oxygen diffusion resistance is obtained by measuring the critical current density in the environment of low oxygen concentration.

As shown in FIG. 10, the first ionomer has the lower diffusion resistance than the second ionomer at the platinum surface area per unit area of the cathode catalyst layer 31c of not greater than 200 (cm$^2$/cm$^2$). In other words, the first ionomer more effectively suppresses the degradation of power generation efficiency of the fuel cell 10 than the second ionomer at the platinum surface area per unit area of the cathode catalyst layer 31c of not greater than 200 (cm$^2$/cm$^2$).

In the working example described above, the platinum coating weight of the cathode catalyst layer 31c was calculated from the diameter of platinum and the other parameters in the manufacturing stage of the fuel cell 10. Alternatively the platinum coating weight may be calculated from the parameters of the manufactured fuel cell 10.

For example, the weight of platinum per unit area of the cathode catalyst layer 31c, i.e., the platinum coating weight, may be determined by ICP-MS (inductively-coupled plasma mass spectrometer). More specifically, the process peels off the catalyst layer from the fuel cell 10 and incinerates a specified area of the peeled catalyst layer. The process then dissolves the incinerated catalyst layer in an acid (for example, aqua regia), dilutes the solution, measures the weight of platinum by ICP-MS analysis and divides the measured weight of platinum by the specified area of incineration to obtain the platinum coating weight.

Another calculation process of the platinum surface area removes the cathode-side separator 33c and the cathode gas diffusion layer 32c from the fuel cell 10 to expose the cathode catalyst layer 31c. The calculation process determines the diameter of platinum by the XRD method in this state (in the exposed state of the cathode catalyst layer 31c on the electrolyte membrane 30) and calculates the platinum surface area according to the same procedure as discussed above. The calculation process may otherwise peel off the cathode catalyst layer 31c from the electrolyte membrane 30, charge the peeled cathode catalyst layer 31c into a capillary and determine the diameter of platinum by the XRD method.

Figure 11:
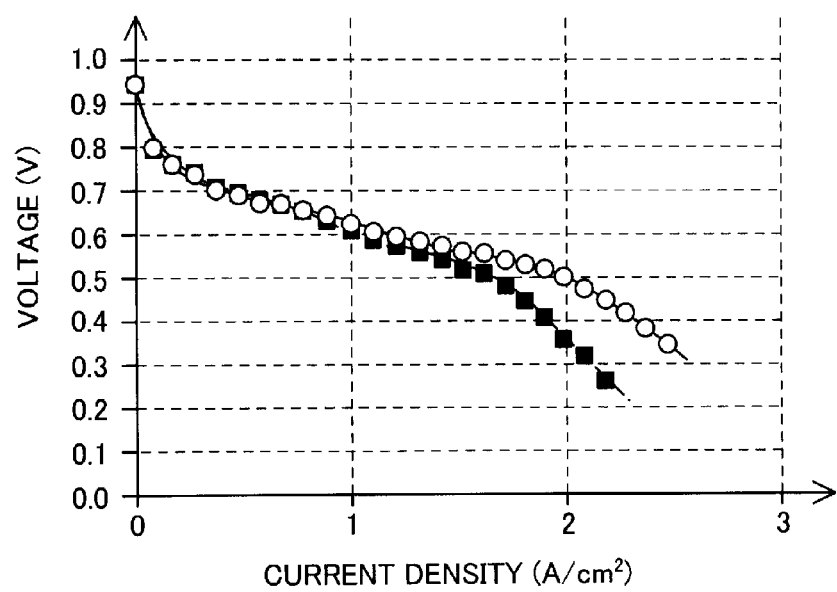
FIG. 11 is a graph showing comparison in power generation efficiency between the ionomer of the working example (first ionomer) and the ionomer of the comparative example (second ionomer) under the condition of small platinum coating weight.

FIG. 11 is a graph showing comparison in power generation efficiency between the ionomer of the working example (first ionomer) and the ionomer of the comparative example (second ionomer) under the condition of small platinum coating weight. The abscissa and the ordinate of FIG. 11 respectively show the current density of the fuel cell 10 and the voltage (electromotive force) of the fuel cell 10.

A fuel cell including the first ionomer as the ionomer for the cathode catalyst layer 31c and a fuel cell including the second ionomer were prepared and operated to generate electric power with sufficient supplies of anode gas (hydrogen gas) and cathode gas (air) (i.e., with excess supplies at the utilization rate of not higher than 50%). The voltage was measured against the varying current density for these fuel cells. The anode gas and the cathode gas were both humidified in the temperature environment of 80 degrees Celsius. The measurement was performed in the environment of cell temperature of 65 degrees Celsius. The platinum coating weight was set to 0.1 mg per unit area of the catalyst layer for both the first ionomer and the second ionomer. The first ionomer and the second ionomer had the oxygen permeability described above with reference to FIG. 8.

As shown in FIG. 11, the first ionomer had the greater electromotive force of the fuel cell at a fixed amount of electric current and the greater amount of electric current at a fixed electromotive force than the second ionomer in the typical practical current density range of 1.0 to 2.0 (A/cm$^2$). The first ionomer had the higher power generation efficiency of the fuel cell 10 than the second ionomer in the condition of the platinum coating weight set to 0.1 mg per unit area of the catalyst layer.

As described above, the cathode catalyst layer 31c of the working example is prepared by setting the platinum coating weight to 0.1 mg per unit area of the cathode catalyst layer 31c and using the ionomer having high oxygen permeability (not less than 2.2*10$^{-14}$ mol/m/s/Pa in the environment of temperature of 80 degrees Celsius and relative humidity of 50%) as the ionomer 140 for the cathode catalyst layer 31c. This effectively suppresses the degradation of power generation efficiency of the fuel cell 10, while reducing the amount of platinum used. As clearly understood from the above description of the embodiment, the platinum coating weight is not restricted to 0.1 mg per unit area of the cathode catalyst layer 31c but is preferably not greater than 0.3 mg per unit area of the cathode catalyst layer 31c. When the amount of platinum used is defined by the platinum surface area per unit area of the cathode catalyst layer 31c, in place of the weight of platinum per unit area of the cathode catalyst layer 31c, the platinum surface area per unit area of the cathode catalyst layer 31c is preferably not greater than 200 cm$^2$/cm$^2$.

C. Modified Examples

Among the various elements of the above embodiment and the working example, those other than the elements disclosed in independent claims are additional and supplementary elements and may be omitted according to the requirements. The invention is not limited to the above embodiment or working example but various modifications including modified examples described below may be made to the embodiment without departing from the scope of the invention.

C-1. Modified Example 1

In the embodiment and the working example described above, platinum is used as the catalyst (catalyst particles 120). The catalyst material is, however, not restricted to platinum but may be any of noble metals including gold, silver, ruthenium, rhodium, palladium, osmium and iridium, base metals including iron, nickel, manganese, cobalt, chromium, copper, zinc, molybdenum, tungsten, germanium and tin, alloys of these noble metals and base metals, metal oxides, metal complexes and other metal compounds. In general, any catalyst for the oxygen reduction reaction shown by Formula (1) given above may be used for the catalyst layer of the invention.

C-2. Modified Example 2

In the embodiment and the working example described above, the cathode catalyst layer 31c is formed by applying the slurry for catalyst layer on the electrolyte membrane 30 or the cathode gas diffusion layer 32c. This is, however, not restrictive. The cathode catalyst layer 31c may be formed by, for example, preparing composite powder containing the catalyst-support carbon 110 and the ionomer 140 by the spray-drying method and making the prepared composite powder deposit on the fuel cell 10 or the cathode gas diffusion layer 32c by the electrostatic screen printing method.

C-3. Modified Example 3

In the embodiment described above, the fuel cell 10 is applied to the fuel cell stack for the driving power supply to the electric vehicle. The fuel cell 10 may also be applicable to a fuel cell stack for power supply to various moving bodies including hybrid vehicles, boats and ships and robots, as well as to a fuel cell stack for stationary power supply to constructions including buildings and houses.

The invention claimed is:

1. A cathode catalyst layer used for a polymer electrolyte fuel cell that includes an electrolyte membrane, comprising:
    a catalyst having weight of not greater than 0.3 mg/cm2 of a reaction surface of the cathode catalyst layer that is adjoining the electrolyte membrane; and
    an electrolyte resin having oxygen permeability of not less than 2.2*10-14 mol/m/s/Pa in an environment of temperature of 80 degrees Celsius and relative humidity of 50%.

2. The cathode catalyst layer according to claim 1, wherein
    the catalyst has weight of not greater than 0.1 mg/cm2 of the reaction surface.

3. The cathode catalyst layer according to claim 1, wherein
    the catalyst has surface area of not greater than 200 cm2/cm2 of the reaction surface.

4. The cathode catalyst layer according to claim 1, wherein
    the catalyst is platinum.

5. The cathode catalyst layer according claim 1, wherein the electrolyte resin is a copolymer comprising:
    (a) polymerized units of one or more fluoromonomer (A-1) or (A-2),

[Chem. 1]

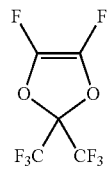

(A-1)

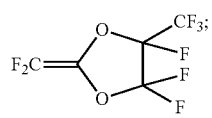

(A-2)

and
    (b) polymerized units of one or more fluoromonomer (B), where the fluoromonomer (B) is selected from perfluorosulfonic acid monomer and derivatives and salts thereof and perfluorosulfonate monomer and derivatives and salts thereof.

6. The cathode catalyst layer according to claim 5, wherein
    the fluoromonomer (B) is CF2=CF—O—[CF2]n-SO2X,
    n=2, 3, 4 or 5,
    X=F, Cl, OH or OM, and
    M is a monovalent cation.

7. A membrane electrode assembly, comprising the cathode catalyst layer according to claim 1.

8. A polymer electrolyte fuel cell, comprising the cathode catalyst layer according to claim 1.

9. A manufacturing method of a polymer electrolyte fuel cell, comprising:
    forming a cathode catalyst layer on either an electrolyte membrane or a gas diffusion layer, wherein
    the cathode catalyst layer includes: an electrolyte resin having oxygen permeability of not less than 2.2*10-14 mol/m/s/Pa in an environment of temperature of 80 degrees Celsius and relative humidity of 50%; and
    a catalyst for oxygen reduction reaction having weight of not greater than 0.3 mg/cm2 of a reaction surface of the cathode catalyst layer.

* * * * *